United States Patent [19]

Kobo et al.

[11] Patent Number: 4,673,979
[45] Date of Patent: Jun. 16, 1987

[54] DIGITAL DATA REPRODUCING SYSTEM

[75] Inventors: Kazuo Kobo, Neyagawa; Noriaki Morotomi; Takeshi Sato, both of Hirakata, all of Japan

[73] Assignee: Matsushita Electric Industrial Co., Ltd., Kadoma, Japan

[21] Appl. No.: 743,366

[22] Filed: Jun. 11, 1985

[30] Foreign Application Priority Data

| Jun. 15, 1984 | [JP] | Japan | 59-123008 |
| Jul. 6, 1984 | [JP] | Japan | 59-140871 |
| Aug. 27, 1984 | [JP] | Japan | 59-177710 |

[51] Int. Cl.⁴ .......................................... H04N 7/087
[52] U.S. Cl. ..................................... 358/142; 358/147; 375/11
[58] Field of Search ............... 358/147, 146, 142, 160; 375/118, 119, 11, 12, 14, 113; 364/178, 179

[56] References Cited

U.S. PATENT DOCUMENTS

| 4,411,000 | 10/1983 | Kustka | 375/11 |
| 4,435,825 | 3/1984 | Tomooka | 375/12 |
| 4,449,145 | 5/1984 | Ciciora | 358/147 |

FOREIGN PATENT DOCUMENTS

| 55-66184 | 5/1980 | Japan. |
| 56-166674 | 12/1981 | Japan. |
| 58-88914 | 5/1983 | Japan. |

OTHER PUBLICATIONS

T. Fischer, U. Langenkamp, and U. Wildhagen, Processing Teletext Signals in Digital TV, Aug. 1984, pp. 224-229.

Primary Examiner—James J. Groody
Assistant Examiner—David E. Harvey
Attorney, Agent, or Firm—Wenderoth, Lind & Ponack

[57] ABSTRACT

A digital data reproducing system which carries out quantization by the frequency over the transmission rate with respect to waveform distortion created by a group delay caused by ghosts and repeaters or the like when digital information signals are received so as to thereby perform waveform equalization, and which carries out phase correction to thereby enable data reproduction about equivalent to that quantized by an ideal sampling timing, thus realizing entire digitization of the data reproducing system.

18 Claims, 20 Drawing Figures

REG: OFFSET REGISTER
D: SIGNAL DELAY ELEMENT

DL: DELAY CIRCUIT
ABS: ABSOLUTE VALUE CIRCUIT

TABLE 1(A)

|  | AMPLITUDE RELATIONSHIP | SIGN RELATIONSHIP |
|---|---|---|
| (a) | \|a\| < \|b\| | SAME |
| (b) | \|a\| > \|b\| | DIFFERENT |
| (c) | \|a\| < \|b\| | SAME |
| (d) | \|a\| > \|b\| | DIFFERENT |

TABLE 1(B)

|  | AMPLITUDE RELATIONSHIP |
|---|---|
| (a) | $\|a\|-\|b\| > 4\cdot\|b\|$ |
| (b) | $1/2\cdot\|a\| < \|a\|-\|b\| < 4\|b\|$ |
| (c) | $\|a\|-\|b\| < 1/2\cdot\|b\|$ |

DIGITAL DATA REPRODUCING SYSTEM

BACKGROUND OF THE INVENTION

1. Field of the Invention

This invention relates to a data reproducing system for digital information signals superposed on television signals.

2. Description of the Prior Art

Recently, in the television broadcasting, digital signals, such as teletext signals, still image signals and facsimile signals, have been superposed on television signals so as to be transmitted, thereby having commenced various services. On the other hand, the signal processing unit for broadcasting equipment has made progress in digitization, integration, and size-reduction.

As disclosed in Japanese Laid-Open Patent Application No. 55066184, the conventional data reproducing system for the teletext signal comprises a waveform shaping circuit, a slicing circuit, a sampling circuit, a bit sync signal sampling circuit, a frequency multiplier circuit, a crystal oscillator exciter circuit, and a clock generator circuit.

The bit sync signal sampling circuit samples the bit sync signal (clock run-in signal) from the teletext signal. The frequency multiplier circuit doubles the bit sync signal so as to be a signal of 5.73 MHz which is equal to the transmission clock frequency of the teletext signal j, the signal of 5.73 MHz excites a crystal of 5.73 MHz in the crystal oscillator exciter circuit, and thereafter continues the excitation for one horizontal time period. The output of the exciter circuit is waveform-shaped in the clock generator circuit so as to be outputted as the sampling clock. Also, the television signal binary-coded by the waveform shaping circuit and slicing circuit is outputted in synchronism with the sampling clock to thereby reproduce data of the teletext signal.

The television signal, however, is subjected to group delay distortion by ghost images or repeaters during the transmission to receivers, whereby the teletext signal is distorted so as to greatly increase its error rate during the data reproduction in the data reproducing circuit.

To cope with the above, a waveform equalizing circuit is used to equalize the waveform of an input signal to the data reproducing circuit, which comprises a plurality of waveform equalizing circuits having different characteristics respectively, and which selects the waveform equalizing characteristic by switching the circuits corresponding to the distortion of the input signal.

With the above-mentioned construction, however, it is difficult to realize the optimum waveform equalizing characteristic with respect to the waveform distortion generated by a transmission line, because the waveform equalizing circuit are limited in number, and such a construction is difficult to automate because of the switching.

On the other hand, as disclosed in Japanese Laid-open patent application No. 56-16674, there is a waveform equalizing circuit using a transversal filter, which comprises a signal delay element, a signal multiplier, a signal adder, and a tap coefficient correction circuit. The transversal filter comprises a signal delay element, a signal multiplier, and a signal adder circuit. The tap coefficient correction circuit controls the transmission characteristic of the transversal filter so as to be of a reverse characteristic corresponding to the distortion in the input signal.

The conventional data reproducing circuit provided with the waveform equalizing circuit as above has the following problems:

(1) The sampling clock is generated only by the bit sync signal of 16 bits, whereby it is difficult to design and adjust a circuit for generating a stable sampling clock for one horizontal time period.

(2) The bit sync signal for deciding the sampling clock indicates the accurate sampling information after waveform-equalizing the input signal. When the waveform equalizing circuit is digitized, at first the signal must be sampled and quantized, but for the above reason, the accurate sampling timing is not obtainable before the waveform equalization.

SUMMARY OF THE INVENTION

An object of the invention is to provide a digital data reproducing system which digitally performs the waveform equalizing and data reproduction with respect to a digital information signal such as the teletext signal superposed on the television signal, thereby improving reliability of the system and realizing the size-reduction, non-adjustment and low manufacturing cost.

Another object of the invention is to provide a digital data reproducing system which varies a delay time of a delay element constituting a digital filter used as a waveform equalizing means and has an offset register, so as a thereby improve the waveform equalizing capability.

The digital data reproducing system in accordance with the present invention comprises; a first clock generating means for producing a first clock having a frequency higher than f Hz, assuming that a transmission rate of an input digital information signal is represented by f b.p.s.; a mean for quantizing in synchronism with the first clock, the digital information signal; a means for waveform-equalizing the quantized signal; a means for carrying out phase correction on an output of the waveform equalizing means; a means for generating a second clock needed to decode an output of the phase correction means so as to obtain a data string; a means for detecting a phase difference from the output signal of the waveform equalizing means, between an ideal sampling phase and the phase of the first clock from the output of said waveform equalizing means; and a control means which transmits phase correction information to the phase correction means on the basis of an output from the phase difference detection means and which transmits information for generating the second clock to the second clock generating means.

The aforesaid construction will quantize the digital information signal not predictable by the sampling timing by using a clock of a frequency which is higher than the transmission rate, and by applying waveform-equalization to the digital information signal. Thereafter, the phase correction is carried out so as to reproduce a data string equivalent to that which would be quantized by the ideal sampling timing, thereby enabling all of the signal processing to be digitized so as to realize improved reliability, non-adjustment and large-scale integration, and in turn, size-reduction and a low manufacturing cost of the system.

BRIEF DESCRIPTION OF THE DRAWINGS

These and other objects and features of the invention will become apparent from the following description taken in connection with the accompanying drawings in which.

DESCRIPTION OF THE PREFERRED EMBODIMENT

Figure 1:
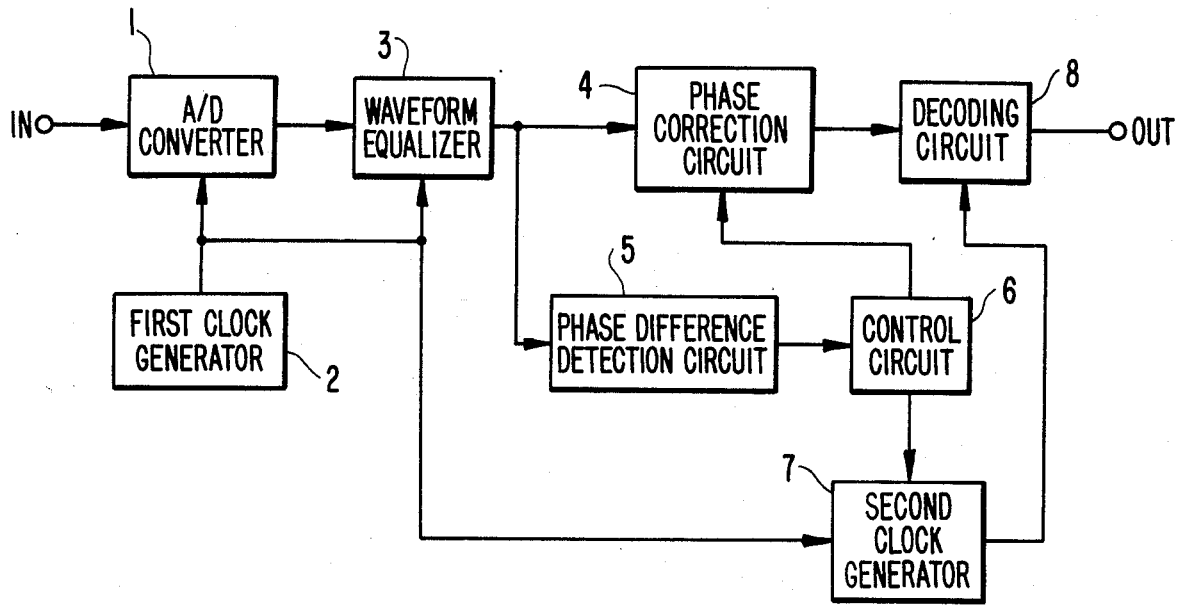
FIG. 1 is a block diagram showing an embodiment of a digital data reproducing system in accordance with the present invention.

Referring to FIG. 1, reference numeral 1 designates an A/D converter; element 2 is a first clock generator; element 3 is a waveform equalizer comprising a digital filter; element 4 is a phase correction circuit, element 5 is a phase difference detection circuit; element 6 is is a control circuit; element 7 is a second clock generator, and element 8 is a signal decoding circuit.

An explanation is provided below on the operation of the digital data reproducing system for the teletext signal superposed on the television signal.

The first clock generator 2 generates a first clock of a frequency F Hz to satisfy the following relationship (1) with respect to a transmission rate f b.p.s. (where $f = 5.737272 \times 10^6$ for example) of the teletext signal:

$$F > f \quad (1)$$

The A/D converter 1 quantizes the input signal in synchronism with the first clock, and the waveform equalizer 3 carries out waveform-equalization on a distortion of the input signal. An output of the waveform equalizer 3 is applied to the phase correction circuit 4 and phase difference detection circuit 5 which detects a phase difference between an ideal sampling phase and the sampling phase by the first clock, and outputs the phase difference information to the control circuit 6. The detection of phase difference for the signal such as the teletext signal having a bit sync signal is performed by using this bit sync. The control circuit 6 outputs the phase correction control information to the phase correction circuit 4 and the clock control information to the second clock generator 7 according to the phase information. The phase correction circuit 4 carries out phase shift operation on the output signal of waveform equalizer 3 according to the phase correction control information, thereby obtaining a signal about equivalent to the sampling signal which would be obtained at the ideal sampling timing. While, the second clock generator 7 generates the second clock according to the clock control information, so that the signal decoding circuit 8 generates the teletext signal data from the second clock and the output of the phase correction circuit 4.

Next, an explanation is provided below on an embodiment of a waveform equalizer composed of a digital filter.

Figure 2:
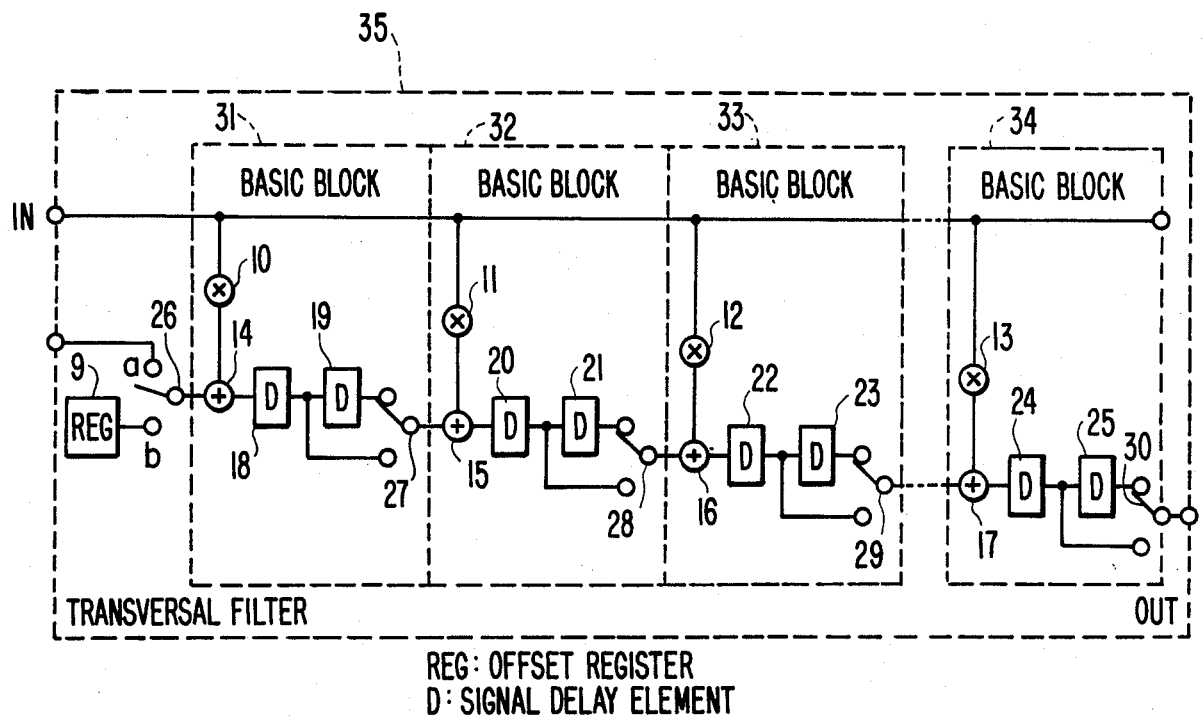
FIG. 2 is a circuit diagram showing an embodiment of a transversal filter.

Referring to FIG. 2, reference numeral 9 designates an offset register; elements 10, 11, 12 and 13 are signal multipliers; elements 14, 15, 16 and 17 are signal adding circuits; elements 18, 19, 20, 21, 22, 23, 24 and 25 are signal delay elements; elements 26, 27, 28, 29 and 30 are switches; elements 31, 32, 33 and 34 are basic blocks comprising the signal multipliers, signal adding circuits and signal delay elements, and element 35 is a transversal filter comprising a plurality of pairs of the basic blocks.

Next, an explanation is provided below on the operation of the basic block 32.

The input signal is fed to all of the signal multipliers. The output of the signal multiplier 11 is fed to the signal adding circuit 15 and added to the output of the basic block 31 of the preceding step. The output of the signal adding circuit 15, after the position of the switch 28 determines whether the signal delay elements 20 and 21 are selected or only the element 20 is selected, is outputted to the basic block 33 of the following stage. The offset register 9 offsets the dc component generated by the transversal filter with respect to the basic block 34.

Next, an explanation is provided below on the operation of the offset register 9, for example, when the input signal is the teletext signal.

Figure 3A:
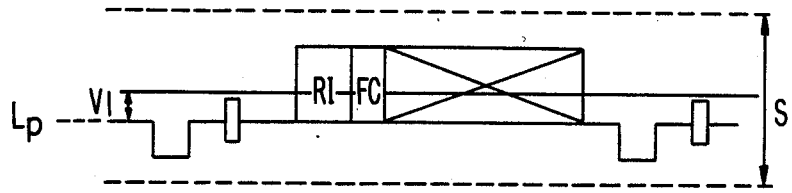
FIGS. 3(A)-3(C) are diagrams showing the teletext signal during one horizontal time period and the operation of an offset register.

Referring to FIG. 3(A), the teletext signal within one horizontal time period is shown, in which a pedestal level Lp generally becomes a zero level, but in order to effectively carry out computation within the A/D conversion range represented by S or within the number of limited bits of the transversal filter, the pedestal level is often offset so that the offset voltage is $V_1$ as shown.

Figure 3B:
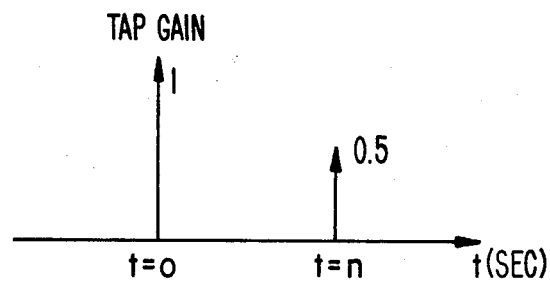

FIG. 3(B) is a view exemplary of tap gains of the transversal filter, showing that the gains at the delay times $t=0$ and $t=n$ are 1 and $\frac{1}{2}$ respectively.

Figure 3C:
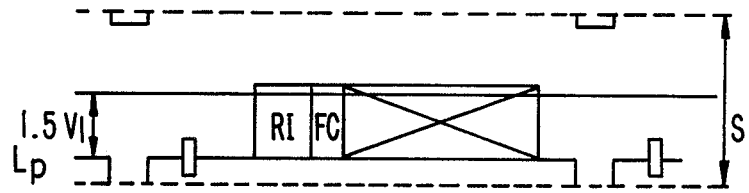

FIG. 3(C) shows the output signal when the teletext signal is fed to the transversal filter having the tap gains shown in FIG. 3(B).

As seen from FIG. 3(C), the teletext signal passes through the transversal filter so as to be newly added to the DC component to result in the offset voltage becoming 1.5 $V_1$ and leads to an overflow within the transversal filter. Hence, the offset register offsets the DC component to enable effective computation by avoiding the overflow in the transversal filter.

In addition, the transversal filter illustrated embodiment of the present invention comprises the basic blocks connected in series, whereby it is possible to add with ease many basic blocks by connecting the switch 26 to the a-terminal.

Next, an explanation is provided below on the characteristic of making variable the delay time for the signal delay element in the case where the frequency of quantization is made to be 2F Hz, that is, two times the transmission rate f b.p.s. of the digital information signal.

Figure 4A:
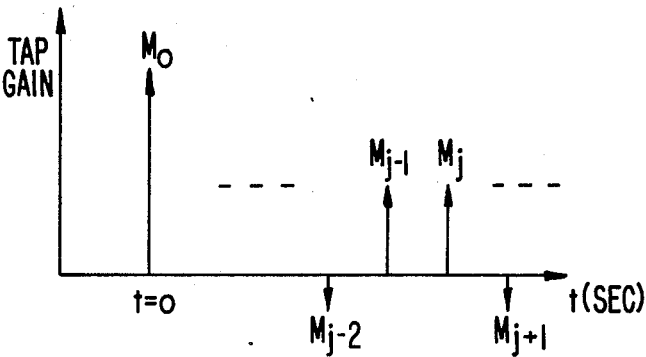
FIGS. 4(A)-4(B) are shows tap coefficient rows when the top intervals of transversal filter are switched.

FIG. 4(A) shows the tap coefficient series when all of the switches are changed over to make the tap interval of the transversal filter twice (1/f) the sampling interval ($\frac{1}{2}$f).

Figure 4B:
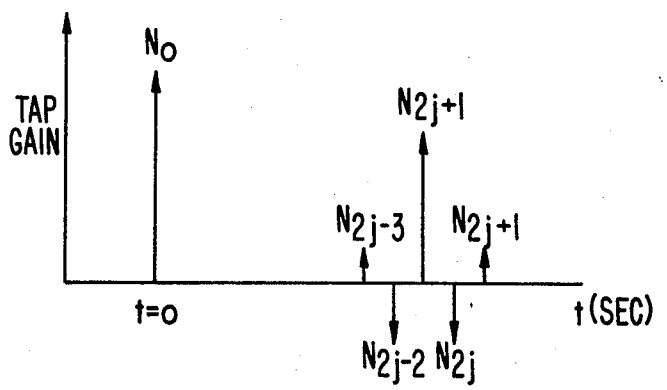

FIG. 4(B) shows the tap coefficient series when all of the switches are changed to equalize the tap interval of the transversal filter to the sampling interval.

In FIGS. 4(A) and 4(B), the abscissa axes represent the timing axes and the ordinate axes represent the tap coefficients respectively, and designating $M_o, \ldots, M_{j-1}, M_j, M_{j+1} \ldots, N_o, \ldots, N_{2j-1}, N_{2j}$ and $N_{2j+1}$ represent the respective values of the coeffcents.

In a case where the waveform equalization is carried out, a coefficient may be required at an intermediate portion of the tap interval depending on the distortion in the signal waveform. If the number of taps is infinite, it is possible to cope with such waveform distortion, but actually, the number of taps is limited by restrictions on the hardware so that the waveform equalization capability is deteriorated in the high frequency of the amplitude frequency characteristic.

Therefore, for the waveform distortion which does not require a large tap coefficient at the intermediate portion of the tap interval, but requires the coefficient at the tap position where the delay time is longer e.g. caused by ghosts or the like, the waveform equalization is carried out by switching the tap interval to be 1/f as shown in FIG. 4(B). On the contrary, in a case where a large coefficient is required at the intermediate portion of the tap interval, the tap interval is switched to be $\frac{1}{2}$f, thereby carrying out the waveform equalization.

Thus, the tap interval is switched to make possible an effective waveform equalization using a limited number of taps.

In addition, this invention is not limited to the aforesaid digital transversal filter carrying out the wave-form equalization, but a digital filter of any construction may be used.

Also, the signal delay elements and switches are not limited to the aforesaid construction, but need only be so constructed that the delay time can be switched to the delay of one clock and of two clocks. The delay time may be switched not to all the taps, but separately to the individual tap.

Figure 5A:
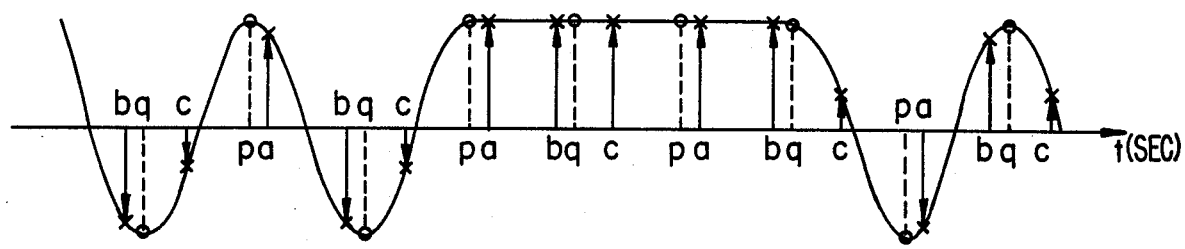
FIGS. 5(A)-5(E) are diagrams showing the operation of a phase correction circuit.
Figure 5B:
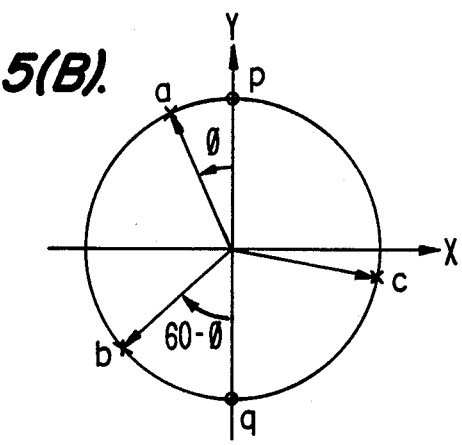
Figure 5C:
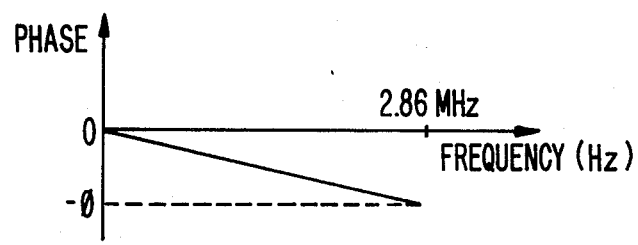

Next, an explanation is provided below on the phase correction by the phase correction circuit 4 with reference to FIGS. 5(A)-5(E). In FIG. 5(A), the teletext signal and the timing for quantization by the A/D converter 1 is shown, in which the quantization timing is represented by the mark "X" and the ideal sampling timing by the mark "0". The first clock frequency to decide the quantization timing is 3/2 times (8,59098 MHz) the transmission rate (5,727272M b.p.s.) of the teletext signal. FIG. 5(B) shows the relationship between the ideal sampling phase and the quantization timing, in which a circle represents one cycle period of a signal of about 2.86 MHz: the maximum transmission frequency component of the teletext signal. In this case, the ideal sampling is carried out on the axis Y. In addition, the quantization timing by the A/D converter 1 is shown by the mark "X" corresponding to FIG. 5(A). Since the first clock, as above-mentioned, is made 3/2 times the transmission rate of the teletext signal, the quantization points, as shown in FIG. 5(B), exist at three points and the ideal sampling points exist at two points with respect to one cycle period of signal of about 2.86 MHz. Also, the quantization points by the A/D converter 1 are discriminated as phases a, b and c every three quantization points and the ideal sampling points as phases p and q every two sampling points. As seen from FIG. 5(B), the phase a lags by $\phi$ relative to the phase p, the phase b leads by (60-$\phi$) relative to the phase q. Hence, when the filter of phase characteristic as shown in FIG. 5(C) is used, the signal of phase a is phase-shifted to be identical with the signal of phase p.

Figure 5D:
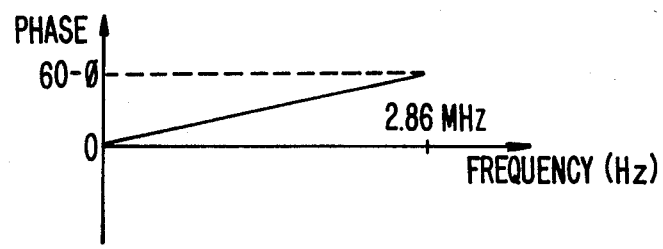
Figure 5E:
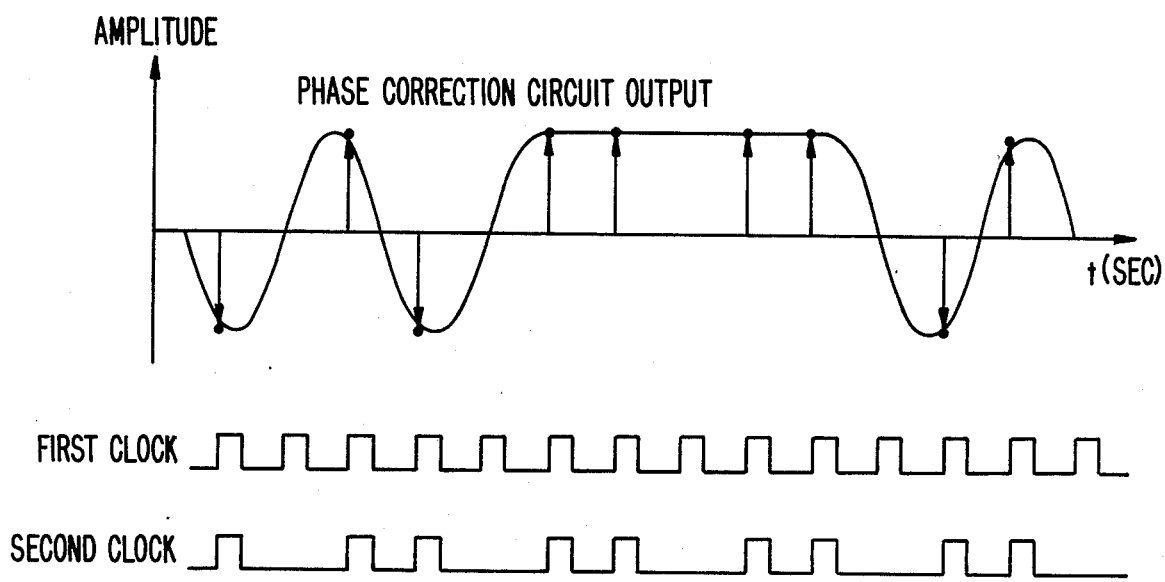

In the same way, when the filter of the phase characteristic as shown in FIG. 5(D) is used the signal of phase b is phase-shifted so as to be identical with the signal of phase q. FIG. 5(E) shows the relationship between the output of the phase correction circuit 4, the first clock, and the second clock, the second clock showing that the signals of phases a and b from the output signals of the phase correction circuit 4 are effective as the reproduced data.

As seen from the above, even when the ideal sampling timing and quantization timing of data after the waveform equalization are different from each other, the phase correction circuit 4 carries out the phase shift operation, whereby the signal about equivalent to that when quantized by the ideal timing, is obtainable.

Figure 6:
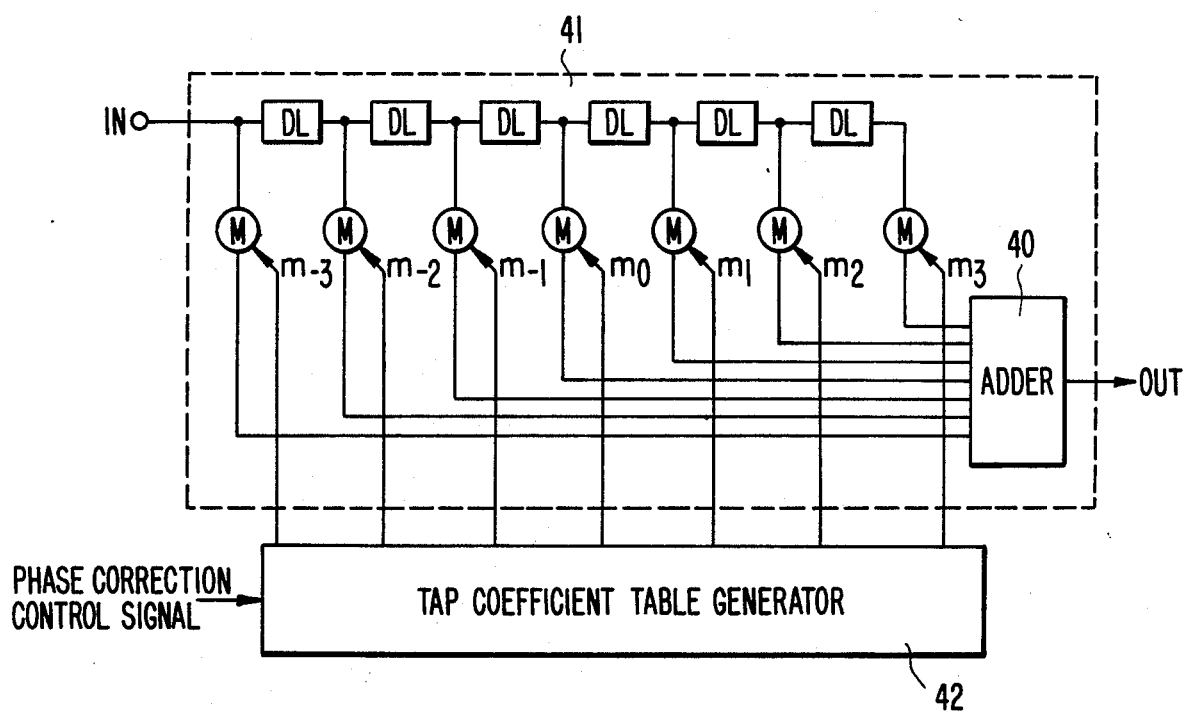
FIG. 6 is a block diagram showing an embodiment of the phase correction circuit.

Referring to FIG. 6, an embodiment of the phase correction circuit is shown, in which reference character DL designates each digital signal delay circuit; and element M is a digital multiplier circuit; element 40 is a signal adding circuit; these circuits constitute a transversal filter 41. Element 42 is a tap coefficient table generator used to generate a plurality of pairs of tap coefficients ($m_{-3}$ to $m_0$ to $m_3$). The tap coefficient table generator 42 sets therein a number of tap coefficients for example, the tap coefficients of the characteristic shown in FIG. 5(D) and obtainable of the phase shift characteristic required by the transversal filter 41 by means of the transmission rate of the input digital information signal, first clock frequency, phase difference detection accuracy of phase difference detection circuit 5 in FIG. 1, and signal correction errors allowable by the phase correction circuit 4, the tap coefficients being selected on the basis of the phase correction control information from the control circuit 6 so as to be the tap coefficients at the transversal filter 41. In FIG. 6, the transversal filter is exemplary as the filter for carrying out the signal phase shift operation, but the number of taps and circuitry of the filter are not limited to FIG. 6, but may be of other filter construction or other circuitry when having the phase shift function of the objective signal.

Figure 7:
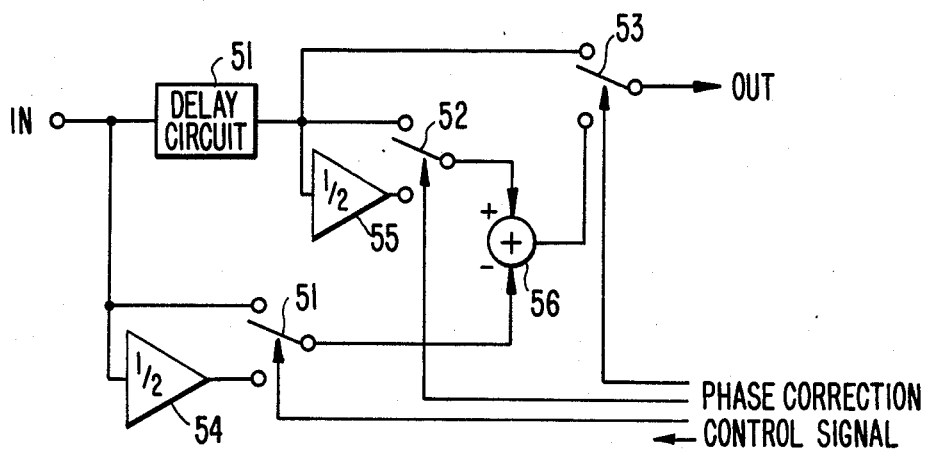
FIG. 7 is a circuit diagram showing a modified embodiment of the phase correction circuit.

FIG. 7 is a circuit diagram of a modified embodiment of the phase correction circuit, in which reference numeral 51 designates a delay circuit; elements 51, 52 and 53 are change-over switches; elements 54 and 55 are designate multipliers with a multiplying factor of $\frac{1}{2}$ respectively, and element 56 is an adder.

Figure 8A:
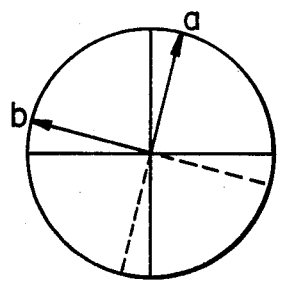
FIGS. 8(A)-8(D) are vector diagrams showing the phase correction.
Figure 8B:
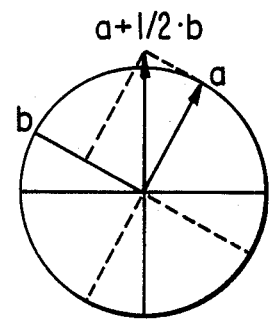
Figure 8C:
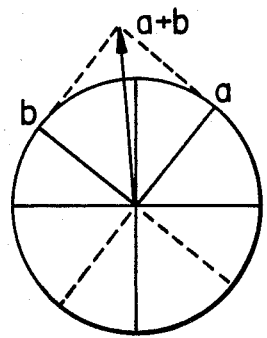
Figure 8D:
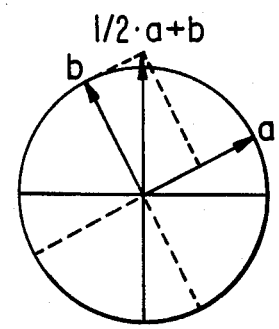

Referring to FIGS. 8(A)-8(D), the switches 51, 52 and 53 are changed over by the phase correction control information, whereby two input signals a and b adjacent to each other are subjected to a phase shift operation by a signal ratio shown in FIGS. 8(A), 8(B), 8(C) or 8(D). FIG. 8(A) represents no phase correction, FIG. 8(B) represents the phase correction carried out for a and b by the signal ratio of 1:$\frac{1}{2}$, FIG. 8(C) the same by 1:1, and FIG. 8(D) in case by $\frac{1}{2}$:1.

Next, an explanation is provided below on the operation of the phase difference detection circuit 5 in the case where the quantization is carried out at a frequency of 2f Hz, twice the transmission rate f b.p.s. of the given digital information signal.

Figure 9:
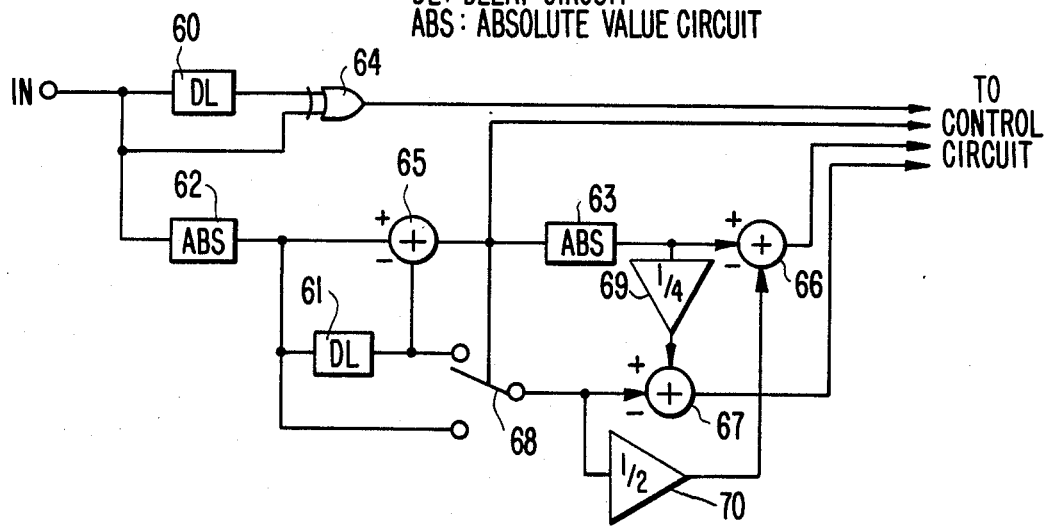
FIG. 9 is a block diagram showing an embodiment of a phase detector.

Referring to FIG. 9, an embodiment of the phase difference detection circuit 5 is shown, in which reference numerals 60 and 61 designate delay circuits; elements 62 and 63 are absolute value circuits respectively; element 64 is an exclusive OR gate; elements 65, 66 and 67 are substractors respectively; element 68 is a switch, and elements 69 and 70 are multipliers with multiplying factors of $\frac{1}{4}$ and $\frac{1}{2}$ respectively.

Figure 10:
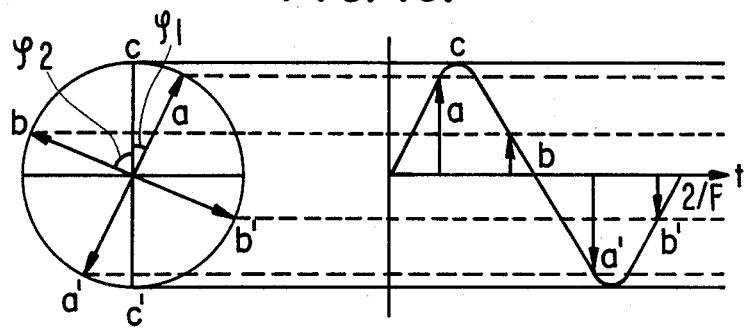
FIG. 10 is a diagram showing the operation of the phase detector.

In FIG. 10, four sampling points a, b, a' and b' for one cycle period of the bit sync signal of the digital information signal, the four sampling points having phase differences of 90° from each other. Reference characters c and c' designate ideal sampling points, and $\phi_1$ and $\phi_2$ designate the phase difference between c and a, and c and b. In addition, a and b will hereinafter be used as the sampling data.

In FIG. 9, the absolute value of input signal is obtained by the absolute value circuit. The exclusive OR gate 64 outputs the sign information of two adjacent sampling data a and b from the input signals to the control circuit 6. The subtractor 65 obtains a difference $|a|-|b|$ between the absolute values $|a|$ and $|b|$ and the result thereof is outputted as the magnitude information to the control circuit 6.

The magnitude information and sign information obtained as above are shown in Table 1 (A).

Also, the switch 68 is changed over to select a smaller one of the absolute values $|a|$ and $|b|$ from the difference $|a|-|b|$ of the absolute values.

A difference value between the smaller selected value and the absolute value of $||a|-|b||/4$ and that between the difference value $|a|-|b|$ of absolute values and the smaller value are outputted to the control circuit 6.

The magnitude information obtained as above is shown in Table 1 (B). The magnitude information and sign information detect a phase difference between the phases of sampling data a and b and the ideal sampling phase.

In the aforesaid circuitry, the multiplying factor is not limited to $\frac{1}{2}$ or $\frac{1}{4}$, and also other circuitry may be used when the phase difference is detectable.

What is claimed is:

1. A digital data reproducing system for reproducing digital data from a digital information signal which is transmitted from a remote transmitter at a transmission rate of f b.p.s., said system comprising:
   a first clock generation means for generating a first clock of a frequency which is greater than f Hz;
   a signal quantizing means for quantizing said digital information signal in synchronism with said first clock;
   a waveform equalizing means for equalizing the waveform of the quantized signal;
   a phase correction means for performing a phase shift correction on the waveform-equalized signal;
   a phase difference detection means for producing from the waveform-equalized signal a phase difference signal corresponding to a phase difference between the phase of said first clock and an ideal sampling phase which is equal to the phase of a clock with which said digital information signal has been transmitted from said remote transmitter;
   a control means responsive to said phase difference signal for producing a phase correction information signal and a second clock information signal, said phase correction information signal being supplied to said phase correction means for controlling said phase correction thereof;
   a second clock generating means responsive to said first clock and said second clock information signal for generating a second clock; and
   a decoding means for decoding an output of said phase corrction means in synchronism with said second clock into said digital data.

2. A digital data reproducing system according to claim 1, wherein the frequency of said first clock is equal to or greater than 2 f Hz.

3. A digital data reproducing system according to claim 2, wherein the frequency of said first clock is 2 f Hz.

4. A digital data reproducing system according to claim 1, wherein said digital information signal is a digital signal superposed on a television signal.

5. A digital data reproducing system according to claim 1, wherein said digital information signal is a teletext signal superposed on a television signal.

6. A digital data reproducing system according to claim 1, wherein said waveform equalizing means is a digital filter.

7. A digital data reproducing system according to claim 6, wherein said digital filter is provided with a circuit for offsetting a DC component of said quantized signal.

8. A digital data reproducing system according to claim 6, wherein said digital filter is a transversal filter comprising multipliers, adders and a plurality of delay circuits.

9. A digital data reproducing system according to claim 8, wherein each of said plurality of delay circuits provides a delay time determined by a switch.

10. A digital data reproducing system according to claim 9, wherein said delay time is selected to be equal to either one or two periods of said first clock.

11. A digital data reproducing system according to claim 9, wherein said delay time provided by each of said plurality of delay circuits is controlled individually.

12. A digital data reproducing system according to claim 9, wherein all of said plurality of delay circuits are simultaneously controlled to provide identical delay times.

13. A digital data reproducing system according to claim 1, wherein said phase correction means comprises a digital filter and a means for storing a plurality of sets of tap coefficients for said digital filter.

14. A digital data reproducing system according to claim 1, wherein said phase correction means comprises a first multiplier for receiving said waveform-equalized signal, a delay circuit for delaying said waveform-equalized signal by one period of said first clock, a second multiplier for receiving the delayed signal from said delay circuit, and an adding circuit for adding outputs of said first and second multipliers.

15. A digital data reproducing system according to claim 14, wherein said first multiplier has a multiplication factor of either 1 or $\frac{1}{2}$ and said second multiplier has a multiplication factor of either 1, $\frac{1}{2}$ or 0, said factors of said first and second multipliers being selected by said phase information signal.

16. A digital data reproducing system according to claim 1, wherein said phase difference detection means detects a phase difference from a byte sync signal contained in said waveform-equalized signal.

17. A digital data reproducing system according to claim 1, wherein said phase difference detection means detects said phase difference according to a magnitude relationship between two timewise adjacent signals in a bit sync signal contained in said waveform-equalized signal.

18. A digital data reproducing system according to claim 17, wherein said phase difference detection means comprises:

a multiplier circuit for multiplying signs of said two timewise adjacent signals in said bit sync signal;

a first absolute value circuit for obtaining absolute values of said two timewise adjacent signals;

a first difference signal producing circuit for producing a first difference signal corresponding to a difference between said absolute values;

a second absolute value circuit for obtaining an absolute value of said first difference signal;

a selecting circuit for selecting a smaller one of said absolute values of said two timewise adjacent signals;

a second difference signal producing circuit for producing a second difference signal corresponding to a difference between a quarter of said absolute value of said first difference signal and said smaller of said absolute values of said two timewise adjacent signals; and a third difference signal producing circuit for producing a third difference signal corresponding to a difference between said absolute value of said first difference signal and a half of said smaller of said absolute values of said two timewise adjacent signals, an output of said multiplier circuit and said first and second and third difference signals being supplied as said phase difference signal to said control means.

* * * * *